(12) United States Patent
Barnard

(10) Patent No.: US 6,186,291 B1
(45) Date of Patent: Feb. 13, 2001

(54) BRAKE SYSTEM FOR HEAVY EQUIPMENT

(76) Inventor: James F. Barnard, 255 Cedar St., Fairview, OR (US) 97204

(*) Notice: Under 35 U.S.C. 154(b), the term of this patent shall be extended for 0 days.

(21) Appl. No.: 09/150,144

(22) Filed: Sep. 9, 1998

(51) Int. Cl.[7] .................................................. F16D 65/24
(52) U.S. Cl. ............................................. 188/170; 310/93
(58) Field of Search .................................. 188/72.3, 170, 188/171, 361, 167, 18 A; 310/77, 93

(56) References Cited

U.S. PATENT DOCUMENTS

| | | | |
|---|---|---|---|
| 3,456,767 | 7/1969 | Hollnagel . | |
| 3,665,232 | * 5/1972 | Speransky et al. | 310/77 |
| 4,042,077 | * 8/1977 | McCarthy | 188/171 |
| 4,381,048 | * 4/1983 | Haverkamp et al. | 188/171 |
| 4,609,080 | * 9/1986 | Sekella | 188/171 |
| 4,638,894 | * 1/1987 | Sitabkhan et al. | 188/170 |
| 4,673,064 | * 6/1987 | Will | 188/18 A |
| 4,823,920 | 4/1989 | Evans . | |
| 5,057,728 | * 10/1991 | Dammeyer et al. | 310/77 |
| 5,101,939 | * 4/1992 | Sheridan | 188/171 |
| 5,306,989 | 4/1994 | Feller, Jr. . | |
| 5,358,078 | 10/1994 | Gajek et al. . | |
| 5,573,314 | 11/1996 | Akita . | |
| 5,679,993 | 10/1997 | Oswald . | |

* cited by examiner

Primary Examiner—Matthew C. Graham
Assistant Examiner—Pamela J. Lipka
(74) Attorney, Agent, or Firm—Robert L. Harrington

(57) ABSTRACT

A braking system for a drive mechanism for a hoist and similar operating motors used on heavy equipment. A rotor is fixedly mounted to a shaft of the drive mechanism. Actuators having brake shoes are mounted strategic to the rotor. The brake shoes are forced against the rotor by springs of the actuators to produce a braking action. The shoes are released from the rotor by hydraulic pressure compressing the springs of the actuators. Controls are provided to coordinate the action of the actuators with the function of the drive mechanism.

9 Claims, 4 Drawing Sheets

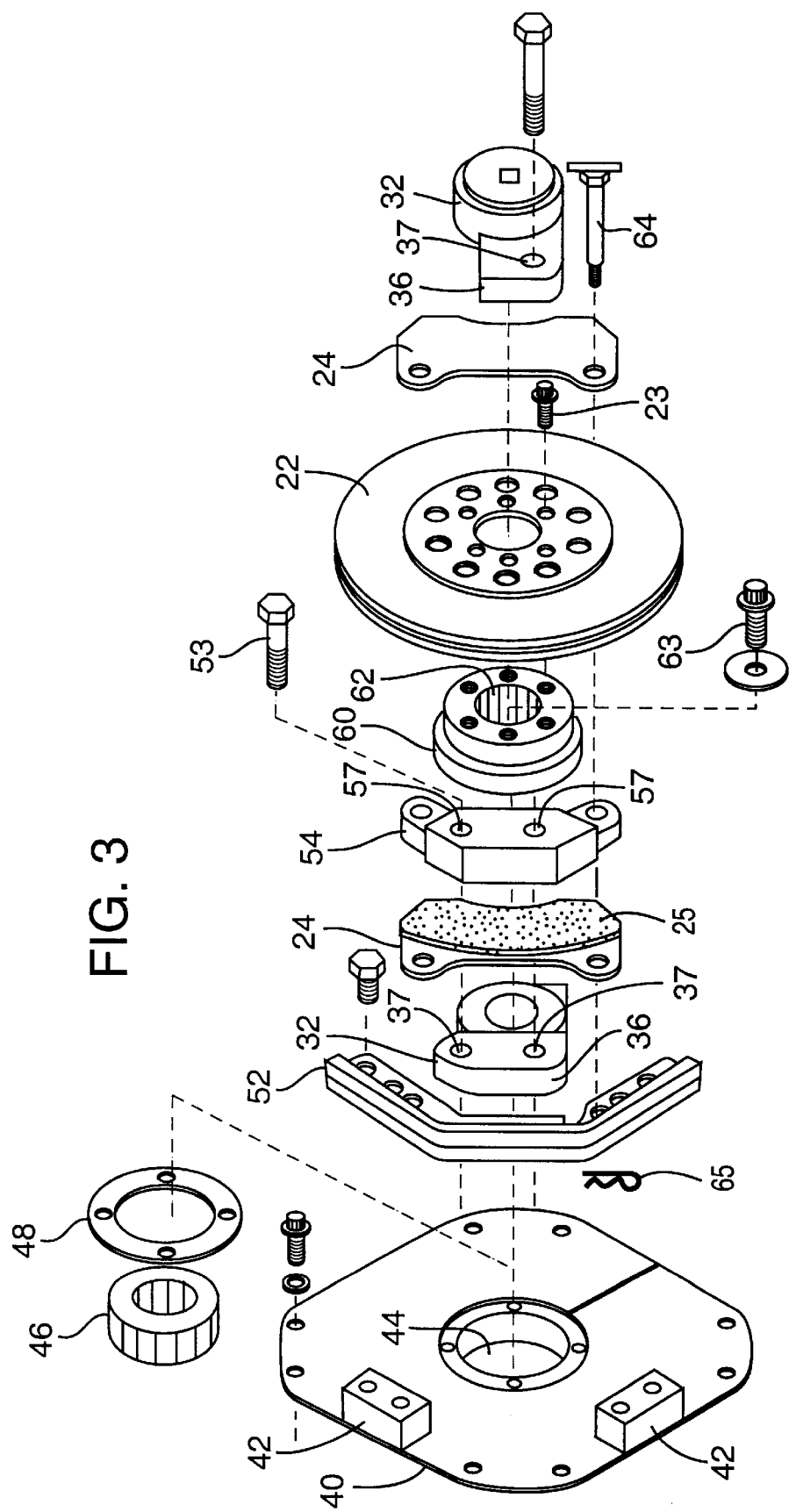

BRAKE SYSTEM FOR HEAVY EQUIPMENT

FIELD OF THE INVENTION

This invention relates to a brake mechanism for releasable braking, e.g., of a cable drum used in heavy equipment.

BACKGROUND OF THE INVENTION

Heavy equipment used for lifting, hoisting, scraping, etc. has moving components such as scoops and blades. These components may be raised or lowered by winding in or playing out cables from a winch, turning gears and the like. Such movements are ongoing continuously in the use of the heavy equipment and will involve something like raising a scoop with product, stopping the scoop at a desired travel level, moving the scoop to a deposit site, lowering the scoop and dumping the product. The cable is repetitively wound onto and off of the winch's drum and/or gears are repeatedly engaged and turned, and at the end of each movement, a brake is applied to stop and then hold the position.

Brakes that are used on such winches or other apparatus are typically complex and expensive, they rapidly wear and are difficult and expensive to repair or replace, and they are noisy.

It is an objective of the present invention to provide an improved braking system for such winches or similar apparatus.

BRIEF DESCRIPTION OF THE INVENTION

In a preferred embodiment of the present invention, a rotor is mounted to the drive shaft of a hoist drum. A pair of brake shoes are movably mounted to each side of the rotor and are slidable into and out of engagement with the rotor. A plunger mechanism or actuator is independently mounted behind each brake shoe. A piston within the mechanism is spring biased to urge the brake shoe into engagement with the rotor and hydraulic pressure urges the piston away from the brake shoe allowing the brake shoe to disengage from the rotor.

A single hydraulic fluid source can service a plurality of the plunger mechanisms each having a remote controlled pump. In its simplest form, the brake is released by operation of the hydraulic fluid pump and sequencing the brake release and engagement of the electric winch motor produces acceptably smooth transition between them. However, a switching system may be used to enhance the cooperative action between brake release/engagement and the power applied to the hoist drum.

Whereas the brake shoes are independently mounted, they can be serviced with little problem or down time. The brake mechanism of the invention outlasts known braking mechanism and is far simpler in its operation and less noisy. The benefits will be more fully understood by reference to the following detailed description and the drawings referred to therein.

BRIEF DESCRIPTION OF THE DRAWINGS

FIG. 3 is an exploded view of the brake system of the present invention including brake shoe actuators as one of the components;

DESCRIPTION OF THE PREFERRED EMBODIMENT

Figure 1:
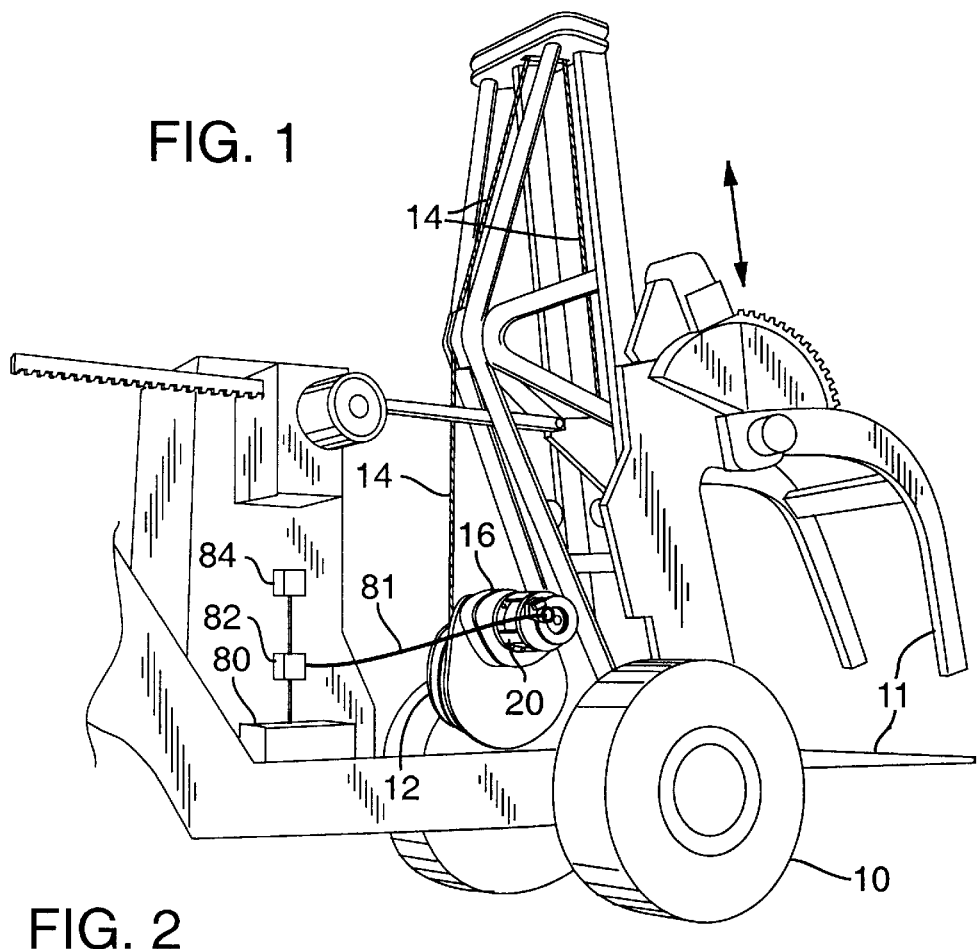
FIG. 1 is a view of an example of an article of heavy equipment incorporating the brake system of the present invention.

Refer now to FIG. 1 of the drawings which illustrates by example a portion of an article of heavy equipment 10 that incorporates the brake system of the present invention. The equipment contemplated herein is of the type that has functional components that are moved by drive systems. In the example of FIG. 1, the equipment 10 has grappling forks 11 that are elevated and lowered by the operation of a cable drum assembly 12. When the cable 14 is deployed off the drum assembly 12, the forks 11 of equipment 10 are lowered. When the cable 14 is wound onto the drum assembly 12, the forks 11 of the equipment 10 are elevated. The proper operation of the drum assembly 12 requires that the drive system 16 of the drum assembly 12 is lockable into a desired position. The drive system 16, for example, is energized to rotate in one direction to wrap cable 14 onto the drum assembly 12 to elevate the forks 11 of the equipment 10. When the forks 11 have been elevated to the desired elevation, the drive system 16 is de-energized and a braking system is required to maintain the drive system in a set position and, therefore, maintain the forks 11 of the equipment 10 at the desired elevation. In this embodiment the brake system of the present invention is applied to the drive system 16 of the cable drum assembly 12.

Figure 2:
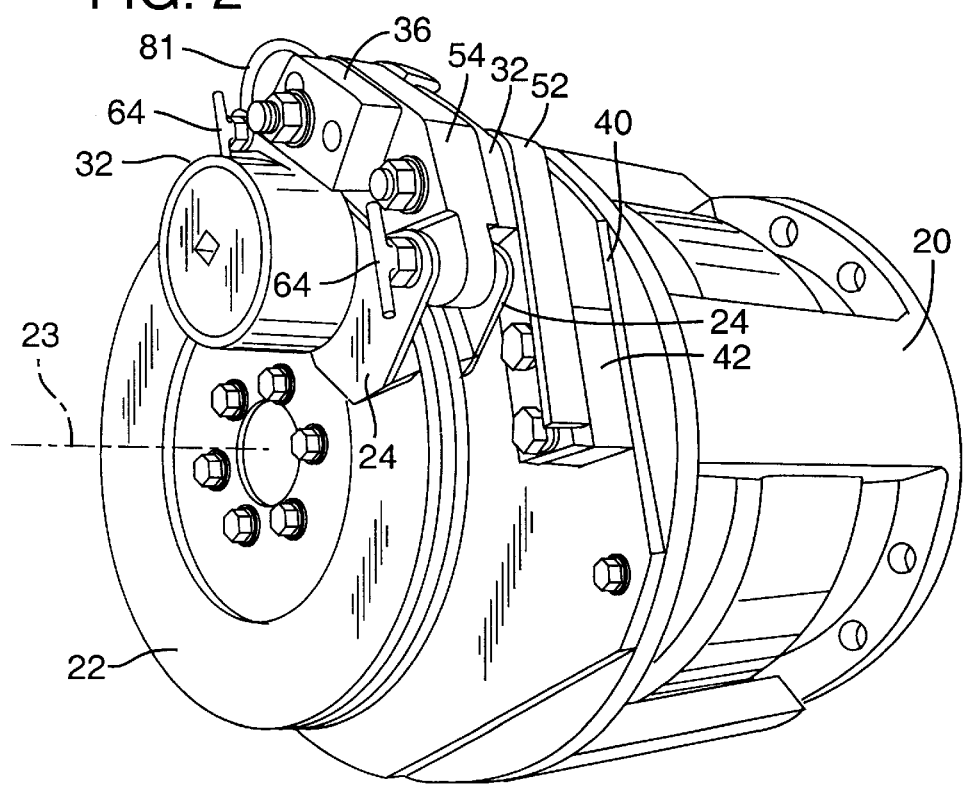
FIG. 2 is a view of the brake system of the present invention applied to a drive system of a cable drum of the article of FIG. 1.

The drive system 16 for the cable drum assembly 12 includes an electric motor 20 as illustrated in more detail in FIG. 2. The motor 20 is rotatably driven in one direction to deploy cable 14 off the drum 12 and is rotated in the opposite direction to reel cable 14 onto the drum assembly 12. Basically, the brake system of the present invention has a rotor 22 fixedly mounted to the end of a splined drive shaft (hidden from view but note center line 23 representing the axis of the drive shaft) of the motor 20. Brake shoes 24 positioned at opposite sides of the rotor are urged into frictional contact with the rotor 22 by spring biased pistons contained within actuators 32. The brake shoes 24 have pads 25 (FIG. 3) that engage the rotor 22. The braking pressure of the actuators 32 is released by hydraulic action acting on the pistons of the actuators 32. The brake system of the present invention thus has the braking force applied by the spring biased pistons of the actuators 32, and the braking force is released by the hydraulic pressure acting in opposition to the spring pressure applied to the pistons which is discussed in detail with reference to FIGS. 3 and 4.

Refer now to FIG. 3 of the drawings which illustrates an exploded view of the braking system of the present invention. An end bracket 40 is mountable to the housing of the motor 20 by conventional fasteners. The bracket 40 has spacer blocks 42 mounted on two of its peripheral edges. The bracket 40 has a center bore 44 which receives a bearing 46 that supports the end of the motor shaft. The bearing is retained in the bore 44 by a bearing keeper 48. The bracket 40 thus rotatably supports the end of the shaft of the motor 20. A support bracket 52 is fixedly attached to the blocks 42 of the bracket 40. The bracket 52 is a shaped member that is arranged to support a spacer block 54 and actuators 32. The spacer block 54 and actuators 32 are fixedly mounted to the bracket 52 by conventional fasteners 53. An actuator 32 is mounted on each side of the spacer block 54.

Figure 4:
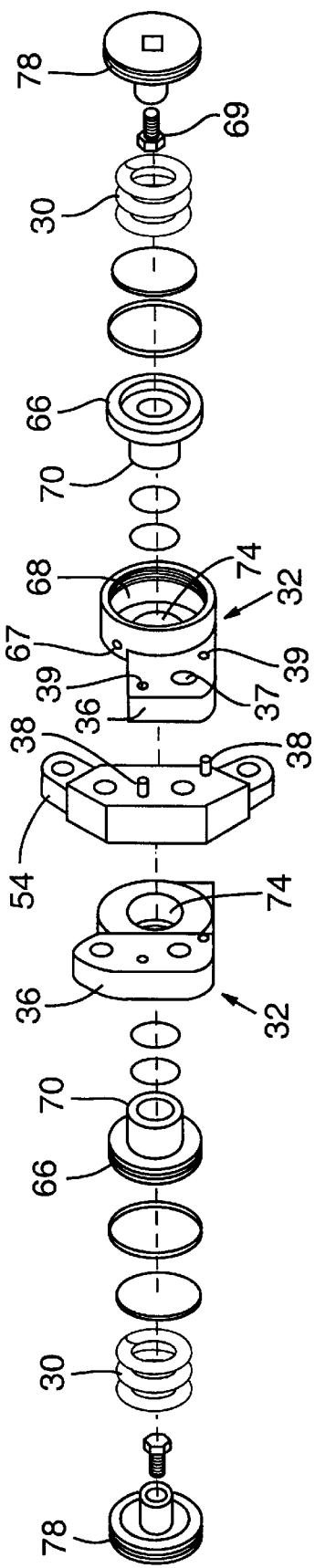
FIG. 4 is an exploded view of the actuators of the brake system of FIG. 3.

The actuators 32 have extending ears 36 that have bores 37 that mate with bores 57 of the spacer block 54 to facilitate mounting the actuators 32 to the spacer block 54 and to the bracket 52. The mating bores of the bracket 52 are out of view in FIG. 3. Conventional fasteners fasten the actuators 32 to the spacer block 54 and bracket 52. As shown in FIG. 4, one of the actuators has an extending ear 36 with only one bore 37. Additional fasteners, such as pins 38 that fit into bores 39 are provided to further secure the actuator 32 against movement relative to the spacer block 54.

An adapter 60 which has internal splines 62 is mounted on the end of the splined motor shaft and retained by fastener 63. A rotor 22 is fixedly mounted to the adapter 60 by fasteners 23 and thus the rotor will rotate with the shaft of the motor 20. Brake pads 24, one on each side of the rotor 22, are slidably mounted on pins 64 that are insertable into the spacer block 54. The pins 64 are secured by a clip 65.

The actuators 32 are further illustrated in FIG. 4 and as previously mentioned, one actuator is mounted on one side of the spacer block 54 and the other actuator is mounted on the other side of the spacer block 54. Each actuator 32 has a piston 66 (plunger) that is received in a bore 68 of the actuator 32 and end 70 of the piston 66 is slidably movable in a bore 74 of the actuators 32. The bore 68 and the piston 66 define an expandable chamber within the actuator 32. A spring 30 is in abutment with the piston 66 and is retained in the bore 68 by an end cap 78. In this embodiment the spring 30 is a plurality of bevel washers. However it will be appreciated that other types of springs may be employed such as a coil spring. The end cap 78 is threadably installed in the bore 68 and is also utilized to adjust the compression of the spring 30. Bolt or screw 69 screwed into the cap 78 serves as a piston stop. Each bore 68 has a port 67 for connecting a hydraulic line 81 (FIG. 1).

Figure 5:
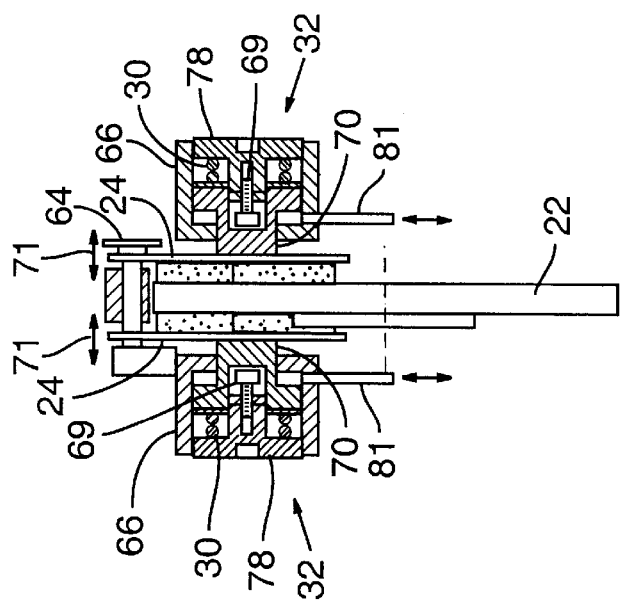
FIG. 5 is a cross section of the brake system for illustrating its operation.

The brake assembly of the present invention is mounted on the drive motor as illustrated in FIG. 2. A hydraulic pump and reservoir 80 (FIG. 1) provides the flow of hydraulic fluid under pressure via hydraulic line 81 to each actuator 32 to move the pistons 66 against the springs 30. The braking action is caused by the springs 30 of each actuator 32 moving the ends 70 of the pistons 66 against the brake shoes 24 which forces the brake shoes 24 into frictional contact with the rotor 22. Release of the brake is accomplished by applying hydraulic pressure against the piston 66 of each actuator 32 to compress the springs 30 and thus to relieve the force urging shoes 24 against the rotor 22. (See FIG. 5)

In operation (FIGS. 1 and 5), when the drive system 16 is idle, (no hydraulic pressure applied), the brake shoes 24 are forced against the rotor 22 by action of the springs 30 acting against plungers 66 (indicated by double arrows 71) to thus lock the motor 20 in a fixed position. Controls 84 are provided to coordinate the release of the brake when the drive motor 20 is energized and to apply the brake when the drive motor 20 is de-energized. When energy is applied to the drive motor 20 to rotate the drum assembly 12 in either direction, the controls 84 will control a hydraulic valve 82 to supply hydraulic pressure through lines 81 to the pistons 66 of the actuators 32. The hydraulic pressure applied to the pistons 66 will force the pistons 66 against the springs 30 to L compress the springs 30, thus releasing the pressure applied by piston 66 against the brake shoes 24 and thus release of the brake shoes applied against the rotor 22. This permits free rotation of the rotor and the drum assembly 12. When the drive motor 20 is de-energized, the control 84 will control the valve 82 to release the hydraulic pressure against the piston 66 and the springs 30 will force the pistons 66 and thus the brake shoes 24 against the rotor 22 to again create a braking action to maintain the drive in a set position.

One of the features of the present invention is the ready replacement of the brake shoes 24 when it is required to replace them due to wear or other causes. When it is necessary to replace the brake shoes 24, the drum assembly 12 is rotated by operation of the motor 20 to a static state. That is, where a braking force is not required. Hydraulic pressure is applied to the pistons 66 of the actuators 32 to release the brake shoes from the rotor 22. The brake shoe retaining pins 64 are simply removed to disassemble the brake shoes from the spacer block and the old brake shoes are simply removed from between the rotor and the actuator 32. Replacement shoes 24 are simply inserted in position to receive the pins 64 slidably connecting the shoes to the spacer block 54 and the brake assembly is ready for operation.

Figure 6A:
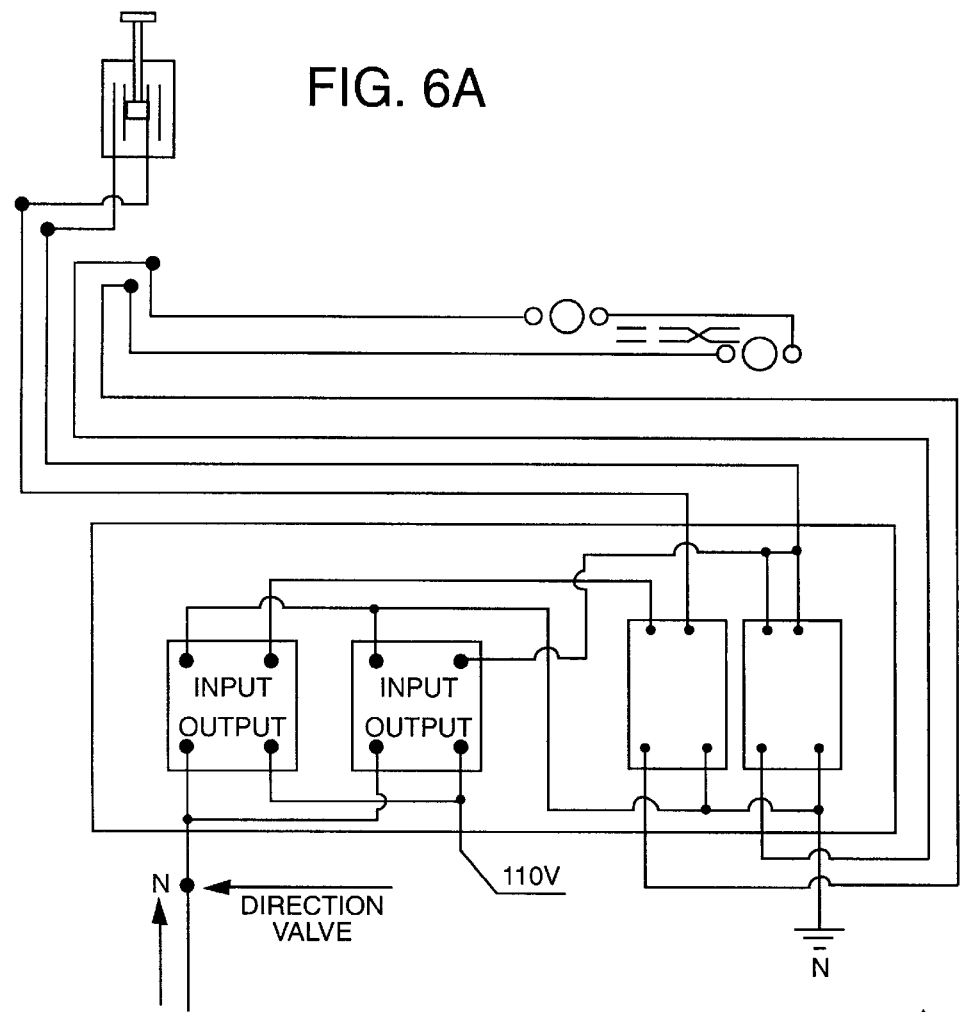
FIGS. 6a and 6b are electrical schematics illustrating a suggested type of control over the braking operation.
Figure 6B:
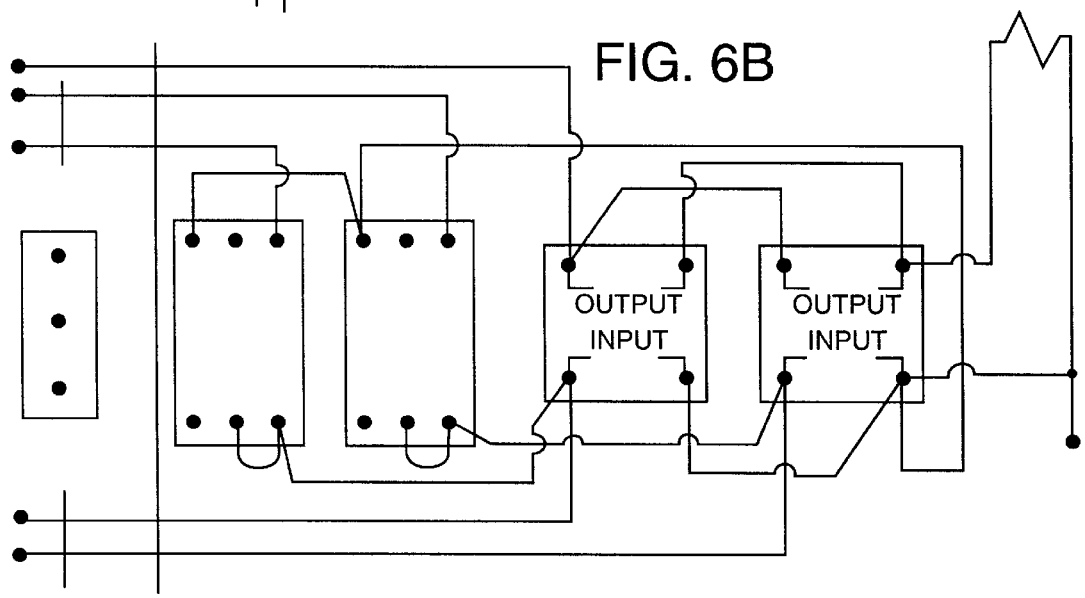

Whereas separate switches may be manually engaged/disengaged to initiate motor and brake actuation, a single switch may be employed to initiate a desired sequence of these actions. FIGS. 6a and 6b illustrate circuitry that may be employed to this end. Those skilled in the art will, without further disclosure or discussion, understand the application of such circuitry and/or related circuitry to satisfy this objective.

Those skilled in the art will recognize that modifications and variations may be made without departing from the true spirit and scope of the invention. For example, whereas the disclosure uses as an example the raising and lowering of grappling forks by a winch, even in the machine that is illustrated, the invention can be applied to the opening and closing action of the tusks (overlying the forks), it can be applied to tilting of the forks and even to the steering of the machine. The latter applications likely are operated by intermeshing gears rather than winches. The invention is therefore not to be limited to the embodiments described and illustrated but is to be determined from the appended claims.

What is claimed is:

1. A braking mechanism for selectively braking a working motor performing an operating function on heavy equipment, said motor having a drive shaft that is selectively rotatably driven and not driven as the motor is started and stopped, the drive shaft protruding through a housing component and exposed for application by a braking mechanism which comprises:

a rotor fixedly attached to the drive shaft protruded through the housing;

a brake shoe mounted on each side of the rotor and each brake shoe slidably movable toward and away from the rotor, a pad portion on each shoe engaging and disengaging the rotor;

a plunger mechanism for each shoe positioned on the side of the shoe opposite the brake pad, said plunger mechanism of each shoe comprising a piston and a spring urging the piston toward the shoe for engagement of the pad with the rotor, and an expandable chamber provided in said plunger mechanism and a media source connected to the chamber, a media control for selectively pressurizing the chamber with media from said media source for expanding the chamber and thereby urging retraction of the piston; and said media control including a switch and control circuitry therefor that initiates cooperative and independent sequencing engagement, disengagement of the brake shoes with the start and stop functions of the motor.

2. A braking mechanism as defined in claim 1 wherein said media is hydraulic fluid, said media source is a reservoir of hydraulic fluid connected to the chamber by a hydraulic conduit and said control is a valve for controlling hydraulic fluid flow through the conduit and into the chamber.

3. A heavy equipment apparatus provided with multiple hoisting functions provided by multiple working motors each having braking mechanism as defined in claim 2, and a common reservoir providing hydraulic fluid to the multiple braking mechanisms.

4. A braking mechanism as defined in claim 1 wherein the spring is a coil spring urging engagement of the brake shoe with the rotor.

5. A braking mechanism for braking a working motor performing an operating function on heavy equipment, said motor having a drive shaft protruding through a housing component and exposed for application by a braking mechanism which comprises:

a rotor fixedly attached to the drive shaft protruded through the housing;

a brake shoe mounted on each side of the rotor and each brake shoe slidably movable toward and away from the rotor, a pad portion on the shoe encasing and disengaging the rotor;

a plunger mechanism for each shoe positioned on the side of the shoe opposite the brake pad, said plunger mechanism of each shoe comprising a piston and a spring urging the piston toward the shoe for engagement of the pad with the rotor, and an expandable chamber provided in said plunger mechanism and a media source connected to the chamber, a media control for selectively pressurizing the chamber with media from said media source for expanding the chamber and thereby urging retraction of the piston;

the plunger mechanism at each side of the rotor provided with ear portions extended beyond the periphery of the rotor, a spacer provided between the ear portions and mounting mechanism including bolts protruded through the ear portions and spacer for mounting the plunger mechanism to the housing, said spacer, ear portions and mounting mechanism cooperatively arranged relative to the rotor and brake shoes for producing the desired braking function.

6. A braking mechanism for braking a working motor performing an operating function on heavy equipment, said motor having a drive shaft protruding through a housing component and exposed for application by a braking mechanism which comprises:

a rotor fixedly attached to the drive shaft protruded through the housing;

a brake shoe mounted on each side of the rotor and each brake shoe slidably movable toward and away from the rotor, a pad portion on the shoe engaging and disengaging the rotor;

a plunger mechanism for each shoe positioned on the side of the shoe opposite the brake pad, said plunger mechanism of each shoe comprising a piston and a spring urging the piston toward the shoe for engagement of the pad with the rotor, and an expandable chamber provided in said plunger mechanism and a media source connected to the chamber, a media control for selectively pressurizing the chamber with media from said media source for expanding the chamber and thereby urging retraction of the piston; and said brake shoes mounted on each side of the rotor being removably mounted between the rotor and plunger mechanism independent of the rotor and plunger mechanism to provide removal and replacement of the brake members and not the plunger mechanism relative to the rotor.

7. A braking mechanism as defined in claim 6 wherein the brake shoes are slidably mounted on guide pins removably attached to the housing independent of the mounting of the plunger mechanism.

8. A braking mechanism for braking a working motor performing an operating function on heavy equipment, said motor having a drive shaft protruding through a housing component and exposed for application by a braking mechanism which comprises:

a rotor fixedly attached to the drive shaft protruded through the housing;

a brake shoe mounted on each side of the rotor and each brake shoe slidably movable toward and away from the rotor, a pad portion on the shoe engaging and disengaging the rotor;

a plunger mechanism for each shoe mounted on the side of the shoe opposite the brake pad and mounted independent of said brake shoe, said plunger mechanism of each shoe comprising a housing that is spaced from the rotor and the brake shoe, wherein the brake shoe is mounted in the space between the housing and the rotor, said plunger mechanism including a piston and a spring urging the piston though an opening in the housing toward the shoe outside the housing for engagement with and urging of the pad against the rotor, and an expandable chamber provided in said plunger mechanism and a media source connected to the chamber, a media control for selectively pressurizing the chamber with media from said media source for expanding the chamber and thereby urging retraction of the piston and thereby permitting slidable movement of the brake shoes away from the rotor.

9. A braking mechanism as defined in claim 8 wherein said housing of the plunger mechanism includes an axially adjustable cap, said spring extending between said cap and said piston whereby axial adjustment of the cap adjusts the spring urging force as applied to the piston.

* * * * *